June 7, 1932. M. J. DORCAS 1,862,300
ARC CARBON FOR PRODUCING ULTRA VIOLET LIGHT
Filed Sept. 29, 1927

INVENTOR:
Merrill J. Dorcas,
BY
ATTORNEYS.

Patented June 7, 1932

1,862,300

UNITED STATES PATENT OFFICE

MERRILL J. DORCAS, OF CLEVELAND, OHIO, ASSIGNOR TO NATIONAL CARBON COMPANY, INC., A CORPORATION OF NEW YORK

ARC CARBON FOR PRODUCING ULTRA-VIOLET LIGHT

Application filed September 29, 1927. Serial No. 222,854.

This invention relates to electrodes for arc lights and especially to electrodes which are adapted for use in producing radiated energy suitable for therapeutic purposes. It is desirable that electrodes used for this purpose shall emit energy rich in ultra-violet. It is well known that the use of various single metals in a carbon electrode will modify the spectral characteristics of rays emitted by an arc. These various metals have certain radiation curves due to the fact that they emit radiations of certain wave lengths with greater intensities than those of other wave lengths. By combining various metals in a carbon it is possible to obtain a smooth spectral energy distribution curve and at the same time secure a greater amount of energy near and in the ultra violet radiation. Metals which are useful for securing this desired radiation are cobalt, tungsten, copper, aluminum, iron and nickel, either as metal or in their compounds. These metals, when employed in the core give prominent bands as set forth in the following table.

| Element in carbon core | Wave length of prominent bands |
|---|---|
| Cobalt | 2300–2500 AU |
|  | 3400–3600 AU |
| Tungsten | 2600–2650 AU |
|  | 3400–3500 AU |
| Copper | 3200–3500 AU |
| Aluminum | 2900–3200 AU |
|  | 2200–2300 AU |
|  | 2500–2700 AU |
| Iron | 3150–3250 AU |
|  | 3000–3100 AU |
|  | 2700–2800 AU |
|  | 2500–2550 AU |
|  | 2250–2350 AU |
| Nickel | 2290–2300 AU |
|  | 2900–3100 AU |
|  | 3400–3600 AU |

Thus by the use of properly selected metals in the core the character of the radiation may be varied within wide limits.

In the accompanying drawing I show spectral energy distribution curves of electrodes containing various metals, the total percentage of metal being substantially the same in each case.

In the drawing, Figure 1 represents the curve of an electrode containing iron;

Figure 1:
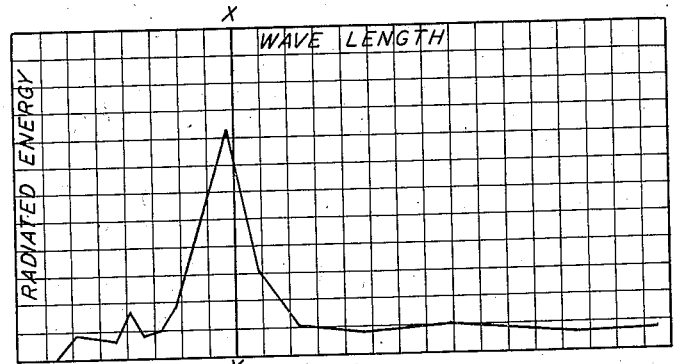
Figure 2:
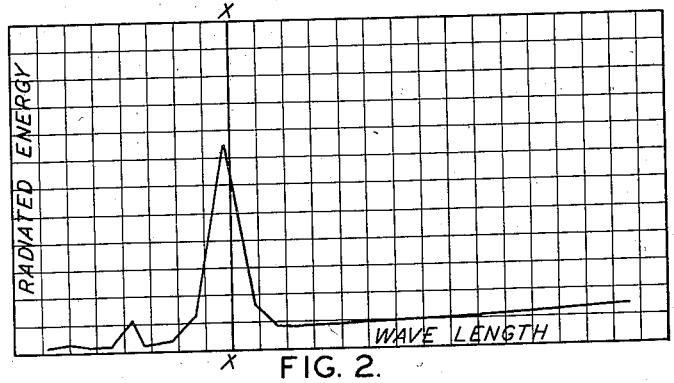
Figure 2 represents the curve of an electrode containing aluminum.
Figure 3:
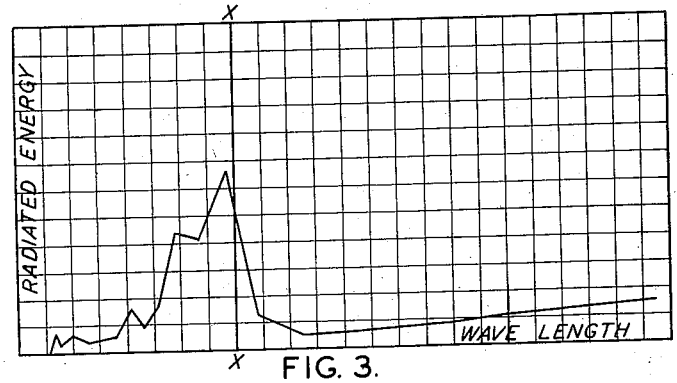
Figure 3 represents the curve of an electrode containing nickel.
Figure 4:
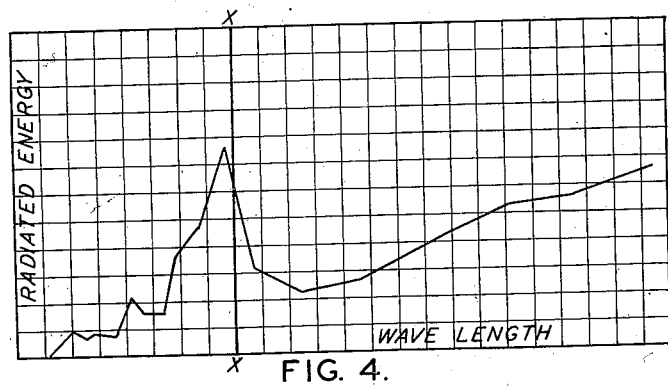
Figure 4 represents the curve of an electrode containing iron, nickel and aluminum. In these figures the line X—X represents the boundary between ultra-violet and visible light.

From an examination of these curves it will be apparent that a combination of the three metals will give a greater amount of ultra-violet radiation than will a corresponding amount of any single metal. It will also be observed that the radiation is more evenly distributed over the entire ultra-violet spectrum in the case where mixtures of the metals are used, than in the case where a single metal is used.

While I may use a solid carbon with the metal distributed evenly throughout, I prefer to use a cored carbon containing the metal mixed with the core. While various amounts of metal may be used in the core I have found it desirable to limit the amount of metal to 50% of the core mix or from 5 to 10% of the total carbon. In preparing electrodes of this type a shell is formed by extruding a mixture of carbon and binder, forming a hollow tube. This shell is baked at a temperature of about 1400° C. A core mix consisting of carbon, a binder and up to 50% of metal is prepared and forced into the shells after they have been cut to approximately the length desired. The electrodes are then heated to harden the core, the temperature required depending upon the type of binder employed.

While I may use various compositions for the core mix the following is given as typical.

| | Parts by weight |
|---|---|
| Iron | 23.4 |
| Nickel | 19.5 |
| Aluminum | 4.5 |
| Carbon flour | 42.6 |
| Potassium silicate | 10 |

In this case the metals are in substantially equal proportions by volume.

While I have found it desirable to employ substantially equal proportions by volume of the metals added to the core, I do not wish to limit myself in this respect as various proportions may be used, however, in any case at least two metals would be present to at least 1% of the core mix.

I claim:

1. A batch for forming cores for electrodes consisting of iron substantially 23 parts by weight, nickel substantially 20 parts by weight, aluminum substantially 4 parts by weight, carbon flour substantially 43 parts by weight, and potassium silicate 10 parts by weight.

2. An electrode for arc lamps comprising a relatively hard carbonaceous shell and a relatively soft core, said core containing carbon, a binder and substantially 20 parts of nickel, 23 parts of iron and 4 parts of aluminum by weight.

3. An electrode for arc lamps comprising a relatively hard carbonaceous shell and a relatively soft core, said core consisting of iron, aluminum, nickel, carbon, and a binder, the combined weight of the three metals being substantially 50% of the entire core.

4. An electrode for arc lamps comprising at least 90% of carbon and binder, with the balance nickel, aluminum, and iron, each of said metals being present in an amount of at least 1%.

In testimony whereof, I affix my signature.

MERRILL J. DORCAS.